(12) United States Patent
Ejiri et al.

(10) Patent No.: US 8,058,320 B2
(45) Date of Patent: *Nov. 15, 2011

(54) THERMALLY FOAMABLE MICROSPHERE, PRODUCTION METHOD THEREOF, USE THEREOF, COMPOSITION CONTAINING THE SAME, AND ARTICLE

(75) Inventors: Tetsuo Ejiri, Fukushima (JP); Mitsuhiro Matsuzaki, Fukushima (JP); Shunzo Endo, Fukushima (JP)

(73) Assignee: Kureha Corporation (JP)

( * ) Notice: Subject to any disclaimer, the term of this patent is extended or adjusted under 35 U.S.C. 154(b) by 568 days.

This patent is subject to a terminal disclaimer.

(21) Appl. No.: 11/662,658

(22) PCT Filed: Sep. 13, 2005

(86) PCT No.: PCT/JP2005/017234
§ 371 (c)(1),
(2), (4) Date: Mar. 13, 2007

(87) PCT Pub. No.: WO2006/030946
PCT Pub. Date: Mar. 23, 2006

(65) Prior Publication Data
US 2007/0219281 A1  Sep. 20, 2007

(30) Foreign Application Priority Data

Sep. 13, 2004  (JP) ................ 2004-265946

(51) Int. Cl.
*C08J 9/16* (2006.01)
*C08J 9/22* (2006.01)
*C08J 9/18* (2006.01)

(52) U.S. Cl. ............... 521/56; 521/57; 521/58; 521/59; 521/60

(58) Field of Classification Search .................. 521/56, 521/60, 57, 58, 59
See application file for complete search history.

(56) References Cited

U.S. PATENT DOCUMENTS

| | | | | |
|---|---|---|---|---|
| 4,853,270 A | * | 8/1989 | Wycech | 428/68 |
| 5,300,534 A | * | 4/1994 | Volkert et al. | 521/98 |
| 5,861,214 A | | 1/1999 | Kitano et al. | |
| 6,025,405 A | | 2/2000 | Tung et al. | |
| 6,080,824 A | | 6/2000 | Tung et al. | |
| 6,100,307 A | | 8/2000 | Tung et al. | |
| 6,214,897 B1 | | 4/2001 | Tung et al. | |
| 6,235,394 B1 | * | 5/2001 | Shimazawa et al. | 428/402.21 |
| 6,410,609 B1 | * | 6/2002 | Taylor et al. | 521/131 |
| 6,509,384 B2 | * | 1/2003 | Kron et al. | 521/56 |
| 6,613,810 B1 | * | 9/2003 | Ejiri et al. | 521/56 |
| 2001/0006159 A1 | * | 7/2001 | Happ et al. | 210/685 |
| 2003/0114546 A1 | | 6/2003 | Satake et al. | |
| 2003/0143399 A1 | | 7/2003 | Satake et al. | |
| 2006/0235095 A1 | * | 10/2006 | Leberfinger et al. | 521/56 |
| 2007/0154711 A1 | * | 7/2007 | Masuda et al. | 428/402.22 |

FOREIGN PATENT DOCUMENTS

| | | |
|---|---|---|
| CA | 2324146 | 9/1999 |
| CN | 1307616 C | 8/2004 |
| EP | 1 067 151 A1 | 3/1999 |
| EP | 1 577 359 A1 | 12/2003 |
| EP | 1 564 276 A1 | 8/2005 |
| JP | 2002-506908 | 5/2002 |
| WO | WO 99/47603 | 3/1999 |
| WO | 99/47603 | 9/1999 |
| WO | WO 02/96635 A1 | 5/2002 |
| WO | WO 04/058910 A1 | 12/2003 |

OTHER PUBLICATIONS

Extended European Search Report for PCT/JP2005/017234 dated Nov. 20, 2007.
International Search Report.

* cited by examiner

*Primary Examiner* — Vasu Jagannathan
*Assistant Examiner* — Irina Krylova
(74) *Attorney, Agent, or Firm* — Reed Smith LLP

(57) ABSTRACT

A thermally foamable microsphere having a structure that a foaming agent is encapsulated in an outer shell formed from a polymer, wherein the foaming agent contains isododecane, and a production process of the thermally foamable microsphere by a suspension polymerization process using a polymerizable monomer and a foaming agent containing dodecane.

10 Claims, No Drawings

THERMALLY FOAMABLE MICROSPHERE, PRODUCTION METHOD THEREOF, USE THEREOF, COMPOSITION CONTAINING THE SAME, AND ARTICLE This application is a 371 National Stage Application of International Application PCT/JP05/17234, filed on Sep. 13, 2005, which claims priority to foreign application JP 2004-265946, filed on Sep. 13, 2004, the disclosures of which are incorporated herein by reference in their entirety.

TECHNICAL FIELD

The present invention relates to a thermally foamable microsphere having a structure that a foaming agent is encapsulated in an outer shell formed from a polymer, and a production method thereof. The present invention also relates to use of the thermally foamable microsphere as a thermally foamable foaming agent, a composition containing the thermally foamable microsphere and a polymer material, and an article containing foamed particles obtained by heating and foaming such thermally foamable microspheres.

BACKGROUND ART

A thermally foamable microsphere is obtained by microcapsulating a volatile foaming agent with a polymer and also called a thermally expandable microcapsule. The thermally foamable microsphere can be generally produced by a process in which a polymerizable mixture containing at least one polymerizable monomer and a volatile foaming agent is suspension-polymerized in an aqueous dispersion medium. An outer shell (shell) is formed by a polymer formed as a polymerization reaction progresses, thereby obtaining the thermally foamable microsphere having a structure that the foaming agent is encapsulated in the outer shell so as to be wrapped in the outer shell.

As the polymer forming the outer shell, is generally used a thermoplastic resin having good gas barrier properties. The polymer forming the outer shell is softened by heating. As the foaming agent, is generally used a low-boiling compound such as a hydrocarbon which becomes a gaseous state at a temperature lower than the softening point of the polymer forming the outer shell. When the thermally foamable microsphere is heated, the foaming agent vaporizes, and the expanding force thereof acts on the outer shell, and also the elastic modulus of the polymer forming the outer shell rapidly decreases. Therefore, rapid expansion occurs bordering on a certain temperature. This temperature is referred to as a foaming start temperature. When the thermally foamable microsphere is heated to a temperature not lower than the foaming start temperature, the microsphere itself expands to form a foamed particle (closed-cell foamed particle).

The thermally foamable microsphere is used in a wide variety of fields as a designing ability-imparting agent, a functionality-imparting agent, a weight-lightening agent and the like making good use of its properties of forming a foamed particle. Specifically, the thermally foamable microsphere is added for use to, for example, polymeric materials such as synthetic resins (thermoplastic resins and thermosetting resins) and rubbers, paints, inks and the like. When high performance comes to be required of the respective application fields, the performance level required of the thermally foamable microsphere is also raised. As an example of the performance required of the thermally foamable microsphere, may be mentioned improvement in processing characteristics.

For example, in foam molding using the thermally foamable microsphere, the thermally foamable microsphere is incorporated into a polymeric material such as a synthetic resin or rubber to form a composition by kneading or calendering, and the composition is then extruded or injected to foam the thermally foamable microsphere in the process thereof.

By this foam molding, a molding or sheet, to which weight lightening has been made, or designing ability has been imparted, can be obtained. Prior to the foam molding, the thermally foamable microsphere may be incorporated into the polymeric material in some cases to prepare pellets by extrusion under conditions that the thermally foamable microsphere is substantially not foamed. Master batch pellets with the thermally foamable microsphere incorporated into the polymeric material may be prepared in some cases, and the master batch pellets may be diluted with the polymeric material to subject the thus-obtained composition to foam molding.

However, the conventional thermally foamable microspheres are generally narrow in foaming start temperature range and initiate foaming at a relatively low temperature, so that the microspheres are easy to cause premature foaming upon kneading or processing such as palletizing prior to the foam molding. Therefore, the processing temperature must be lowered, and so the kinds of applicable synthetic resins and rubbers have been limited.

The foaming start temperature of the thermally foamable microsphere can be controlled by properties of the polymer forming the outer shell, such as glass transition temperature, molecular weight and softening temperature, and the boiling point of the foaming agent. When a high-boiling foaming agent is used for raising the foaming start temperature, the foaming agent comes to have a high molecular weight, so that an internal pressure upon vaporization becomes low, and it is difficult to raise an expansion ratio. In order to raise the internal pressure upon the vaporization using the high-boiling foaming agent, it is necessary to increase the content of the foaming agent. When the content of the high-boiling foaming agent is increased on the other hand, the thickness of the outer shell must be thinned, so that the vaporized foaming agent escapes through the outer shell to lower the expansion ratio. In other words, it is not that the mere use of the high-boiling foaming agent is better for raising the foaming start temperature.

On the other hand, the thermally foamable microsphere is often heated and foamed (expanded) after it is mixed with a binder resin for a paint or ink, or after coating or printing is conducted with the resultant mixture. However, when the foaming start temperature is too high, the decomposition of the paint or the deterioration of the resultant coating film by heat occurs, or difficulty is encountered on a foaming operation, so that the foaming start temperature cannot be made high. When a low-boiling foaming agent is used, it is easy to initiate foaming at a low temperature and raise the internal pressure upon the vaporization.

Therefore, a low-boiling organic compound has heretofore been used as the foaming agent in the technical field of thermally foamable microspheres. Examples of typical foaming agents include hydrocarbons such as ethane, ethylene, propane, propene, n-butane, isobutane, butene, isobutene, n-pentane, isopentane, neopentane, n-hexane, isohexane, cyclohexane and heptane; chlorofluorocarbons such as $CCl_3F$; and tetraalkylsilanes such as tetramethylsilane (for example, U.S. Pat. No. 6,613,810).

In order to obtain a thermally expandable microcapsule (thermally foamable microsphere) expanding at a relatively low temperature without lowering heat resistance and chemical resistance, there has heretofore been proposed a method in which at least two hydrocarbons different in boiling point from each other are encapsulated (U.S. Pat. No. 5,861,214). However, the resultant thermally expandable microcapsule is such that its processing temperature cannot be made high because two or more of such low-boiling hydrocarbons as described above are used in combination even in this method.

When the thermally foamable microsphere is contained in a composition to be processed at a high temperature, a method of using isooctane (i.e., 2,2,4-trimethylpentane) as a foaming agent has been proposed in order to prevent unintended premature foaming during mixing (for example, US 2003-114546A1, US 2003-143399A1, U.S. Pat. No. 6,235,394 and U.S. Pat. No. 6,509,384). However, the boiling point of isooctane is 99.25° C. and is not sufficiently high, so that sufficient heat resistance cannot be imparted to the resulting thermally foamable microsphere. A thermally foamable microsphere making use of isooctane alone or a mixture of isooctane and a hydrocarbon having a boiling point lower than isooctane as a foaming agent is not permitted making the foaming start temperature sufficiently high. In addition, the thermally foamable microsphere making use of isooctane as a foaming agent is yet insufficient in that a shrink phenomenon due to gas escaping is prevented.

In general, thermally foamable microspheres involve a problem of the shrink phenomenon due to gas escaping. When a thermally foamable microsphere is heated, the outer shell first starts to soften, and at the same time the foaming agent encapsulated therein starts to gasify to raise the internal pressure of the microsphere into an expanded state. When the heating is further continued, the microsphere starts to shrink because gas passes and diffuses through the outer shell thinned by the expansion.

The conventional thermally foamable microspheres tend to cause rapid foaming. When the softening of the outer shell rapidly occurs upon foaming, the expanded thermally foamable microsphere shrinks again because the vaporized foaming agent passes and diffuses through the outer shell. This phenomenon is referred to as shrink.

In order to prevent the shrink phenomenon of the thermally expandable microcapsules (thermally foamable microspheres), there has heretofore been proposed a method in which a monomer component at least 70% by weight of a nitrile monomer such as acrylonitrile or methacrylonitrile is used to form an outer shell, and a proportion of a volatile expanding agent (foaming agent) having a branched or cyclic structure is controlled to at least 30% by weight (EP 1 564 276 A1). In the method disclosed in this document, however, low-boiling hydrocarbons such as isobutane, isopentane, neopentane, isohexane, cyclohexane and 2,2-dimethylhexane are used as the volatile expanding agent. The thermally expandable microcapsule with the low-boiling hydrocarbon encapsulated therein expands at a low temperature and is low in foaming start temperature, so that a processing temperature prior to foaming cannot be made high. This thermally expandable microcapsule tends to cause shrink at a high temperature after foaming.

As described above, the conventional thermally foamable microspheres have been difficult to make a processing temperature prior to foam molding sufficiently high. In addition, the conventional thermally foamable microspheres have been marked in the shrink phenomenon upon foam molding or under high-temperature conditions. Furthermore, the conventional thermally foamable microspheres have been difficult to control their expansion ratios to a desired value because foaming rapidly occurs.

DISCLOSURE OF THE INVENTION

It is an object of the present invention to provide a thermally foamable microsphere, which can inhibit unintended premature foaming and is little in shrink due to gas escaping after foaming. Another object of the present invention is to provide a thermally foamable microsphere, which can provide foamed particles having a desired expansion ratio by controlling foaming conditions.

A further object of the present invention is to provide a method for producing the thermally foamable microsphere having such excellent various properties. A still further object of the present invention is to provide use of the thermally foamable microsphere as a thermally foamable foaming agent, a composition containing the thermally foamable microsphere and a polymer material, and an article containing foamed particles obtained by heating and foaming such thermally foamable microspheres.

The present inventors have carried out an extensive investigation with a view toward achieving the above objects. As a result, it has been found that isododecane (i.e., 2,2,4,6,6-pentamethylheptane, boiling point=177° C.), which is a high-boiling hydrocarbon that has heretofore been not used as a foaming agent in this technical field, is used either singly or in combination with any other foaming agent, thereby providing a thermally foamable microsphere excellent in processability at a high temperature before foaming and little in shrink after foaming.

In the thermally foamable microsphere according to the present invention, its foaming start temperature can be made sufficiently high, so that undesired premature foaming is effectively inhibited even when the microsphere is heated to a high temperature upon mixing with various synthetic resins, rubbers and binder resins. Although the foaming start temperature of the thermally foamable microsphere according to the present invention is high when it is kept intact, the foaming start temperature can be lowered by heat-treating the microsphere in advance. For example, after the thermally foamable microsphere according to the present invention is subjected to a processing step of mixing it with a synthetic resin, rubber or binder resin, the foaming start temperature can be lowered by heat-treating the mixture in advance.

The thermally foamable microsphere according to the present invention is little in shrink due to gas escaping as demonstrated by the fact that its expansion ratio can be retained at a high level even when the microsphere is continuously heated at a high temperature after its foaming. The expansion ratio of the thermally foamable microsphere according to the present invention can be controlled to a desired value by adjusting the foaming start temperature.

The present invention has been led to completion on the basis of these findings.

According to the present invention, there is thus provided a thermally foamable microsphere having a structure that a foaming agent is encapsulated in an outer shell formed from a polymer, wherein the foaming agent contains isododecane.

According to the present invention, there is also provided a method for producing a thermally foamable microsphere having a structure that a foaming agent is encapsulated in an outer shell formed from a polymer formed by suspension-polymerizing at least one polymerizable monomer in the presence of the foaming agent in an aqueous dispersion medium containing a dispersion stabilizer, wherein the foaming agent contains isododecane.

According to the present invention, there is further provided use of the thermally foamable microsphere as a thermally foamable foaming agent, a composition comprising the thermally foamable microsphere and a polymer material, and an article containing foamed particles obtained by heating and foaming such thermally foamable microspheres.

BEST MODE FOR CARRYING OUT THE INVENTION

The thermally foamable microsphere according to the present invention has a structure that a foaming agent is encapsulated in an outer shell formed from a polymer. The thermally foamable microsphere having such a structure can be generally produced by suspension-polymerizing at least one polymerizable monomer in the presence of the foaming agent in an aqueous dispersion medium containing a dispersion stabilizer.

(1) Vinyl Monomer

As the polymer forming the outer shell is preferred a homopolymer or copolymer obtained by polymerizing a polymerizable monomer or polymerizable monomer mixture containing at least one vinyl monomer selected from the group consisting of vinylidene chloride, acrylonitrile, methacrylonitrile, acrylic acid, methacrylic acid, acrylic esters, methacrylic esters, aromatic vinyl compounds and vinyl acetate.

Examples of the acrylic esters include methyl acrylate, ethyl acrylate, butyl acrylate and dicyclopentenyl acrylate. However, the acrylic esters are not limited thereto. Examples of the methacrylic esters include methyl methacrylate, ethyl methacrylate, butyl methacrylate and isobornyl methacrylate. However, the methacrylic esters are not limited thereto. Examples of the aromatic vinyl compounds include styrene, α-methylstyrene and halogenated styrene derivatives. However, the aromatic vinyl compounds are not limited thereto.

In addition to the above-mentioned monovinyl monomers, various kinds of vinyl monomer, for example, nitrile monomers such as α-chloroacrylonitrile, α-ethoxyacrylonitrile, fumaronitrile; vinyl chloride; conjugated dienes such as chloroprene, isoprene and butadiene; N-substituted maleimides such as N-phenylmaleimide, N-naphthylmaleimide, N-cyclohexylmaleimide and methylmaleimide; and unsaturated acids such as acrylic acid, methacrylic acid, crotonic acid and maleic anhydride may be used as the vinyl monomers as needed.

In the thermally foamable microsphere according to the present invention, the polymer forming the outer shell is preferably excellent in gas barrier properties and more preferably excellent in gas barrier properties, heat resistance and solvent resistance. From these points of view, the polymer forming the outer shell is preferably a homopolymer or copolymer of vinylidene chloride, or a homopolymer or copolymer of acrylonitrile and/or methacrylonitrile, more preferably a vinylidene chloride copolymer or a (meth)acrylonitrile copolymer, and particularly preferably a (meth)acrylonitrile copolymer.

As examples of the vinylidene chloride (co)polymer, may be mentioned a homopolymer and copolymers obtained by using, as a polymerizable monomer, vinylidene chloride alone or a mixture of vinylidene chloride and a vinyl monomer copolymerizable therewith. Examples of the monomer copolymerizable with vinylidene chloride include acrylonitrile, methacrylonitrile, methacrylic esters, acrylic esters, styrene and vinyl acetate. In the present invention, the (co)polymer means a homopolymer or copolymer.

As such a vinylidene (co)polymer is preferred a (co)polymer obtained by using, as polymerizable monomer(s), (A) 30 to 100% by weight of vinylidene chloride and (B)0 to 70% by weight of at least one vinyl monomer selected from the group consisting of acrylonitrile, methacrylonitrile, acrylic esters, methacrylic esters styrene and vinyl acetate. It is not preferable that the proportion of vinylidene chloride copolymerized is lower than 30% by weight, since the gas barrier properties of the resulting outer shell become too low.

As another vinylidene chloride (co)polymer is preferred a copolymer obtained by using, as polymerizable monomers, (A1) 40 to 80% by weight of vinylidene chloride, (B1) 0 to 60% by weight of at least one vinyl monomer selected from the group consisting acrylonitrile and methacrylonitrile and (B2) 0 to 60% by weight of at least one vinyl monomer selected from the group consisting of acrylic esters and methacrylic esters. By using such a copolymer, the foaming temperature of the resulting microsphere is easy to be designed, and a high expansion ratio can be easily achieved.

The outer shell is preferably formed from a (meth)acrylonitrile (co)polymer from the viewpoints of solvent resistance and foamability at a high temperature. In the present invention, the (meth) acrylonitrile means acrylonitrile and/or methacrylonitrile. In other words, the (meth)acrylonitrile means at least one nitrile monomer selected from the group consisting of acrylonitrile and methacrylonitrile. As nitrile monomers, α-chloroacrylonitrile, α-ethoxyacrylonitrile, fumaronitrile or the like may be used in combination with acrylonitrile and/or methacrylonitrile as needed.

As examples of the (meth)acrylonitrile (co)polymer, may be mentioned (co)polymers obtained by using, as polymerizable monomer(s), (meth)acrylonitrile alone or copolymer obtained by using meth(acrylonitrile) and a vinyl monomer copolymerizable therewith. The vinyl monomer copolymerizable with (meth)-acrylonitrile is preferably vinylidene chloride, an acrylic ester, a methacrylic ester, styrene or vinyl acetate.

Such a (meth)acrylonitrile (co)polymer is preferably a (co)polymer obtained by using, as polymerizable monomer(s) (C) 30 to 100% by weight of at least one nitrile monomer selected from the group consisting of acrylonitrile and methacrylonitrile and (D) 0 to 70% by weight of at least one other vinyl monomer selected from the group consisting of vinylidene chloride, acrylic esters, methacrylic esters, styrene and vinyl acetate. If the proportion of the (meth)acrylonitrile copolymerized is lower than 30% by weight, the solvent resistance and heat resistance of the resulting microsphere become insufficient.

The (meth)acrylonitrile (co)polymers may be divided into a (co)polymer that the proportion of (meth) acrylonitrile used is high, and the foaming temperature is high, and a (co)polymer that the proportion of (meth)acrylonitrile use is low, and the foaming temperature is low. Examples of the (co)polymer that the proportion of (meth)acrylonitrile used is high include (co)polymers obtained by using, as polymerizable monomer(s), (C) 70 to 100% by weight of at least one nitrile monomer selected from the group consisting of acrylonitrile and methacrylonitrile and (D) 0 to 30% by weight of at least one other vinyl monomer selected from the group consisting of vinylidene chloride, acrylic esters, methacrylic esters, styrene and vinyl acetate. On the other hand, examples of the (co)polymer that the proportion of (meth)acrylonitrile used is low include copolymers obtained by using, as polymerizable monomers, (C) 30% by weight to lower than 70% by weight of at least one nitrile monomer selected from the group consisting of acrylonitrile and methacrylonitrile and (D) higher than 30% by weight to 70% by weight of at least one other vinyl monomer selected from the group consisting of vinylidene chloride, acrylic esters, methacrylic esters, styrene and vinyl acetate.

As the (meth)acrylonitrile (co)polymer is preferred a (co)polymer obtained by using, as polymerizable monomer(s), (C1) 51 to 100% by weight of at least one nitrile monomer selected from the group consisting of acrylonitrile and methacrylonitrile, (D1) 0 to 40% by weight of vinylidene chloride and (D2) 0 to 48% by weight of at least one monomer selected from the group consisting of acrylic esters and methacrylic esters.

When a (co)polymer containing no vinylidene chloride is desired as the shell polymer, preference is given to a (meth)acrylonitrile (co)polymer obtained by using, as polymerizable monomer(s), (E) 30 to 100% by weight of at least one nitrile monomer selected from the group consisting of acrylonitrile and methacrylonitrile and (F) 0 to 70% by weight of at least one monomer selected from the group consisting of acrylic esters and methacrylic esters. Preference is also given to a copolymer obtained by using, as polymerizable monomers, (E1) 1 to 99% by weight of acrylonitrile, (E2) 1 to 99% by weight of methacrylonitrile and (F) 0 to 70% by weight of at least one monomer selected from the group consisting of acrylic esters and methacrylic esters.

In order to obtain a thermally foamable microsphere far excellent in processability, foamability, gas barrier properties, solvent resistance and the like, it is preferable to use a (meth)acrylonitrile copolymer obtained by polymerizing a polymerizable monomer mixture containing 70 to 99% by weight of at least one nitrile monomer selected from the group consisting of acrylonitrile and methacrylonitrile and 1 to 30% by weight of other vinyl monomer(s). In this (meth)acrylonitrile copolymer, acrylonitrile and methacrylonitrile are preferably used in combination, and a nitrile monomer mixture containing 20 to 80% by weight of acrylonitrile and 20 to 80% by weight of methacrylonitrile is more preferably used. The proportion of the nitrile monomer in the polymerizable monomer mixture is preferably 80 to 99% by weight, more preferably 85 to 98% by weight. As the other vinyl monomers are preferred acrylic esters and methacrylic esters. However, various kinds of the vinyl monomers mentioned above may also be used in addition to these monomers.

(2) Crosslinkable Monomer

In the present invention, as polymerizable monomers, such vinyl monomers as mentioned above and a crosslinkable monomer may be used in combination. The combined use of the crosslinkable monomer permits the resulting thermally foamable microsphere to improve processability, foaming properties, heat resistance, solvent resistance and the like. As the crosslinkable monomer, is used a polyfunctional compound having at least two polymerizable carbon-carbon double bonds (—C=C—). Examples of the polymerizable carbon-carbon double bonds include vinyl, methacryl, acryl and allyl groups. At least two polymerizable carbon-carbon double bonds may be the same or different from each other.

Examples of the crosslinkable monomer include bifunctional crosslinkable monomers, such as aromatic divinyl compounds such as divinylbenzene, divinylnaphthalene and derivatives thereof; diethylenically unsaturated carboxylic esters such as ethylene glycol diacrylate, diethylene glycol diacrylate, ethylene glycol dimethacrylate and diethylene glycol dimethacrylate; acrylates or methacrylates derived from aliphatic alcohols having hydroxyl groups at both ends, such as 1,4-butanediol and 1,9-nonanediol; and divinyl compounds such as N,N-divinylaniline and divinyl ether.

Other examples of the crosslinkable monomer include trifunctional or still higher polyfunctional crosslinkable monomers such as trimethylolpropane triacrylate, trimethylolpropane trimethacrylate, pentaerythritol triacrylate, pentaerythritol trimethacrylate and triacrylformal.

Among the crosslinkable monomers, bifunctional crosslinkable monomers having 2 polymerizable carbon-carbon double bonds are preferred in that the foamability and processability of the resulting microsphere are easy to be balanced with each other. The bifunctional crosslinkable monomer is preferably a compound having a structure that 2 polymerizable carbon-carbon double bonds are linked directly or indirectly through a folding chain derived from a diol compound selected from the group consisting of polyethylene glycol, polypropylene glycol, alkyldiols, alkyl ether diols and alkyl ester diols.

Examples of the bifunctional crosslinkable monomer having the structure that 2 polymerizable carbon-carbon double bonds are linked through the folding chain include polyethylene glycol diacrylate, polyethylene glycol dimethacrylate, polypropylene glycol diacrylate, polypropylene glycol dimethacrylate, alkyldiol diacrylates, alkyldiol dimethacrylates, alkyl ether diol diacrylates, alkyl ether diol dimethacrylates, alkyl ester diol diacrylates, alkyl ester diol dimethacrylates and mixtures of 2 or more compounds thereof.

When a bifunctional crosslinkable monomer having such a folding chain is used as the crosslinkable monomer, the temperature dependence of the elastic modulus of the shell polymer can be made small while retaining the expansion ratio of the resulting microsphere at a high level. In addition, there can be provided a thermally foamable microsphere hard to cause breakdown of the outer shell and escaping of the encapsulated gas even when shearing force is applied thereto in a processing step such as kneading, calendering, extrusion or injection molding.

The proportion of the crosslinkable monomer used is generally at most 5 parts by weight per 100 parts by weight of the vinyl monomer, preferably 0.01 to 5 parts by weight, more preferably 0.05 to 4 parts by weight, particularly preferably 0.1 to 3 parts by weight. If the proportion of the crosslinkable monomer used is too low, the processability of the resulting microsphere is deteriorated. If the proportion is too high, the thermoplasticity of the polymer forming the outer shell is lowered to encounter difficulty on foaming.

(3) Foaming Agent

In the present invention, isododecane is used as the foaming agent. Isododecane is the same as a compound called 2,2,4,6,6-pentamethylheptane ($C_{12}H_{26}$) and has a boiling point as high as 177° C. It has also heretofore been proposed to use a high-boiling hydrocarbon as a foaming agent. However, only an example where isooctane (i.e., 2,2,4-trimethylpentane) having a boiling point of 99.25° C. was used has been specifically reported (for example, the above-described US 2003-114546 A1, US 2003-143399 A1, U.S. Pat. No. 6,235,394 and U.S. Pat. No. 6,509,384), and no hydrocarbon having a high boiling point exceeding this, particularly a boiling point as high as 177° C. has not been actually used.

Since isododecane is a hydrocarbon having a high boiling point comparative with the conventional foaming agents, unpreferable premature foaming can be prevented by using a foaming agent containing isododecane even when the processing temperature of the resulting thermally foamable microsphere is raised. In addition, it has also been found that isododecane has a feature hard to pass through the outer shell after foaming to cause gas escaping, since it has a bulky steric structure compared with a hydrocarbon of a linear structure.

In the present invention, isododecane may be used singly, and isododecane and other foaming agents may also be used in combination. The other foaming agents include foaming agents publicly known in this technical field. The other foaming agent may be used either singly or in any combination of two or more thereof. The combined use of, for example, a foaming agent having a lower boiling point than isododecane as the other foaming agent permits controlling an internal pressure (vapor pressure by foaming agents) upon foaming, whereby the processability and foamability of the resulting microsphere at a high temperature can be balanced with each other. In addition, the combined use of the low-boiling foaming agent makes it easy to control a foaming temperature range.

Examples of foaming agents having a boiling point lower than isododecane include hydrocarbons such as ethane, ethylene, propane, propene, n-butane, isobutane, butene, isobutene, n-pentane, isopentane, neopentane, isooctane (i.e., 2,2,4-trimethylpentane), n-hexane, isohexane and n-heptane; chlorofluorocarbons such as $CCl_3F$; and tetraalkylsilanes such as tetramethylsilane. These foaming agents may be used either singly or in any combination of two or more thereof.

Hydrocarbons having a boiling point lower than that of isododecane are preferred as the other foaming agents used in combination with isododecane, and the boiling points thereof are preferably 110° C. or lower, more preferably 100° C. or lower.

The foaming agent used in the present invention preferably contains isododecane in a proportion of 30 to 100% by weight. More specifically, the foaming agent used in the present invention preferably contains 30 to 100% by weight of isododecane and 0 to 70% by weight of the other foaming agent(s). In order to control a vapor pressure upon foaming and a foaming start temperature range while retaining good processability at a high temperature, in the case where isododecane and a foaming agent having a boiling point lower than isododecane are used in combination, a mixture containing 30 to 99% by weight of isododecane and 1 to 70% by weight of the foaming agent having a boiling point lower than that is preferred, a mixture containing 35 to 95% by weight of isododecane and 5 to 65% by weight of the foaming agent having a boiling point lower than that is more preferred, and a mixture containing 40 to 90% by weight of isododecane and 10 to 60% by weight of the foaming agent having a boiling point lower than that is particularly preferred. In many cases, isododecane can be preferably used in a range of from more than 50% by weight to not more than 90% by weight from the viewpoints of processability at a high temperature and inhibition of a shrink phenomenon.

Low-boiling foaming agents used in combination with isododecane may be roughly divided into foaming agents having a boiling point of lower than 60° C. and foaming agents having a boiling point of 60 to 110° C. One or more of the foaming agents having a boiling point of lower than 60° C. may be used. Likewise, one or more of the foaming agents having a boiling point of 60 to 110° C. may be used. The foaming agents having a boiling point of lower than 60° C. and the foaming agents having a boiling point of 60 to 110° C. may be respectively used singly in combination with isododecane. However, a combination of both foaming agents may also be used in combination with isododecane. These low-boiling foaming agents are preferably low-boiling hydrocarbons.

When isododecane and the foaming agent having a boiling point of lower than 60° C. are used in combination, a higher expansion ratio can be achieved. Since the foaming agent having a boiling point of lower than 60° C. is generally a low-molecular weight compound, it contributes to increase of an expansion ratio because the number of moles thereof increases compared with a high-boiling foaming agent when it is used in an equal amount.

A hydrocarbon having a boiling point of 60 to 110° C., preferably 60 to 100° C. particularly contributes to heat resistance and foaming properties at a high temperature in addition to the contribution to the expansion ratio. When a combination of the foaming agents having a boiling point of lower than 60° C. and the foaming agents having a boiling point of 60 to 110° C. is used in combination with isododecane, no particular limitation is imposed on the used proportions thereof. However, they are used in a proportion of generally 1:99 to 99:1, preferably 5:95 to 95:5 in terms of a weight ratio.

The proportion of the foaming agent encapsulated in the thermally foamable microsphere is generally 5 to 50% by weight, preferably 7 to 40% by weight based on the whole weight of the microsphere. Accordingly, the proportions of the polymerizable monomer and foaming agent used are desirably controlled in such a manner that the shell polymer and foaming agent amount to the above-described proportions after polymerization.

(4) Production Method of Thermally Foamable Microsphere

The thermally foamable microsphere according to the present invention can be produced by a method of suspension-polymerizing at least one polymerizable monomer in the presence of a foaming agent in an aqueous dispersion medium containing a dispersion stabilizer. A polymerizable monomer mixture containing at least the polymerizable monomer and the foaming agent is dispersed in the aqueous dispersion medium to form droplets of the oily polymerizable monomer mixture. The formation of the droplets of the polymerizable monomer mixture may also be called particle formation. After the formation of the droplets, the polymerizable monomer is polymerized by using a polymerization initiator. In the present invention, a foaming agent containing isododecane is used as the foaming agent. A thermally foamable microsphere having a structure that the foaming agent is encapsulated in an outer shell formed from a polymer formed by the suspension polymerization can be obtained.

As the polymerization initiator, may be used that generally used in this technical field. However, an oil-soluble polymerization initiator that is soluble in the polymerizable monomer is preferred. Examples of such polymerization initiator include dialkyl peroxides, diacyl peroxides, peroxyesters, peroxydicarbonates and azo compounds.

Specific examples of the polymerization initiator include dialkyl peroxides such as methyl ethyl peroxide, di-t-butyl peroxide and dicumyl peroxide; diacyl peroxide such as isobutyl peroxide, benzoyl peroxide, 2,4-dichlorobenzoyl peroxide and 3,5,5-trimethylhexanoyl peroxide; peroxyesters such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate and (α,α-bis-neodecanoylperoxy)diisopropylbenzene; peroxydicarbonates such as bis(4-t-butylcyclohexyl) peroxydicarbonate, di-n-propyl peroxydicarbonate, diisopropyl peroxydicarbonate, di(2-ethylethylperoxy) dicarbonate, dimethoxybutyl peroxydicarbonate and di(3-methyl-3-methoxybutylperoxy) dicarbonate; and azo compounds such as 2,2'-azobisisobutyronitrile, 2,2'-azobis(4-methoxy-2,4-dimethylvaleronitrile), 2,2'-azobis(2,4-dimethyl-valeronitrile) and 1,1'-azobis(1-cyclohexanecarbonitrile).

The polymerization initiator is generally contained in the polymerizable monomer mixture. However, when it is required to inhibit premature polymerization, a part or the whole thereof may be added into the aqueous dispersion medium to shift it into droplets of the polymerizable monomer mixture during or after the formation of the droplets. The polymerization initiator is generally used in a proportion of 0.0001 to 3% by weight based on the aqueous dispersion medium.

The suspension polymerization is generally conducted in the aqueous dispersion medium containing the dispersion stabilizer. As examples of the dispersion stabilizer, may be mentioned inorganic fine particles of silica, magnesium hydroxide and the like. For example, condensation products of diethanolamine and an aliphatic dicarboxylic acid, polyvinyl pyrrolidone, polyethylene oxide and various kinds of emulsifiers may be used as co-stabilizers. The dispersion stabilizer is generally used in a proportion of 0.1 to 20 parts by weight per 100 parts by weight of the polymerizable monomer.

The aqueous dispersion medium containing the dispersion stabilizer is generally prepared by mixing the dispersion stabilizer and the co-stabilizer into deionized water. The pH of the aqueous phase upon the polymerization is suitably determined according to the kinds of the dispersion stabilizer and co-stabilizer used. For example, when silica such as colloidal silica is used as the dispersion stabilizer, the polymerization is conducted under an acidic environment. In order to acidify the aqueous dispersion medium, an acid is added as needed to adjust the pH of the reaction system to 6 or lower, preferably about 3 to 4. In the case of a dispersion stabilizer dissolved in the aqueous dispersion medium under an acidic environment, such as magnesium hydroxide or calcium phosphate, the polymerization is conducted under an alkaline environment.

A preferable combination of the dispersion stabilizers includes a combination of colloidal silica and a condensation product. The condensation product is preferably a condensation product of diethanolamine and an aliphatic dicarboxylic acid, particularly preferably a condensation product of diethanolamine and adipic acid or condensation product of diethanolamine and itaconic acid. The acid value of the condensation product is preferably not lower than 60, but lower than 95, more preferably 65 to 90. When an inorganic salt such as sodium chloride or sodium sulfate is further added, a thermally foamable microsphere having an evener particle shape is easy to be obtained. As the inorganic salt, is preferably used common salt.

The amount of the colloidal silica used varies according to the particle diameter thereof. However, it is generally 1 to 20 parts by weight, preferably 2 to 15 parts by weight per 100 parts by weight of the polymerizable monomer. The condensation product is used in a proportion of generally 0.05 to 2 parts by weight per 100 parts by weight of the polymerizable monomer. The inorganic salt is generally used in a proportion of 0 to 100 parts by weight per 100 parts by weight of the polymerizable monomer.

Other preferable combinations of the dispersion stabilizers include combinations of colloidal silica and a water-soluble nitrogen-containing compound. Among these, a combination of colloidal silica and polyvinyl pyrrolidone is preferred. In addition, further preferable combinations include combinations of magnesium hydroxide and/or calcium phosphate and an emulsifier.

As the dispersion stabilizer, may be used colloid of a hardly water-soluble metal hydroxide (for example, magnesium hydroxide) obtained by a reaction of a water-soluble polyvalent metal salt compound (for example, magnesium chloride) with an alkali metal hydroxide (for example, sodium hydroxide) in an aqueous phase. As the calcium phosphate, may be used a reaction product of sodium phosphate with calcium chloride in an aqueous phase.

No emulsifier is generally used. If desired, however, anionic surfactants, for example, salts of dialkyl sulfosuccinic acid and phosphoric esters of polyoxyethylene alkyl (allyl) ethers may also be used.

As a polymerization aid, at least one compound selected from the group consisting of alkali metal nitrites, stannous chloride, stannic chloride, water-soluble ascorbic acids and boric acid may also be caused to exist in the aqueous dispersion medium. When the suspension polymerization is conducted in the presence of these compounds, no aggregation of polymer particles formed occurs upon the polymerization, and the polymer does not adhere to the wall of a polymerization vessel, so that the foamable microsphere can be stably produced while efficiently removing heat generated by the polymerization.

Among the alkaline metal nitrites, sodium nitrite and potassium nitrite are preferred from the viewpoints of easy availability and price. The ascorbic acids include ascorbic acid, metal salts of ascorbic acid and esters of ascorbic acid. Among these, water-soluble ones are preferred. In the present invention, the water-soluble ascorbic acids means those having a solubility of at least 1 g/100 $cm^3$ in water of 23° C. Among these, L-ascorbic acid (vitamin C), sodium ascorbate and potassium ascorbate are particularly preferably used from the viewpoints of easy availability, price, and action and effect. These compounds are used in a proportion of generally 0.001 to 1 part by weight, preferably 0.01 to 0.1 part by weight per 100 parts by weight of the polymerizable monomer.

The order that the respective components are added to the aqueous dispersion medium is optional. However, water and the dispersion stabilizer, and optionally the co-stabilizer and polymerization aid are generally added to one another to prepare an aqueous dispersion medium containing the dispersion stabilizer. The foaming agent, polymerizable monomer (vinyl monomer) and crosslinkable monomer may be added separately to the aqueous dispersion medium to unite them in the aqueous dispersion medium, thereby form a polymerizable monomer mixture (oily mixture). However, these components are generally mixed in advance, and the resultant mixture is then added into the aqueous dispersion medium. The polymerization initiator may be added for use to the polymerizable-monomer in advance. When there is need of avoiding premature polymerization, however, for example, the polymerizable monomer mixture may be added into the aqueous dispersion medium, and the polymerization initiator may then be added with stirring to unite them in the aqueous dispersion medium. The mixing of the polymerizable monomer mixture with the aqueous dispersion medium may be conducted in a separate container to stir and mix the resultant mixture in a stirring machine or dispersing machine having high shearing force, and the mixture may then be charged into a polymerization vessel.

The polymerizable monomer mixture and the aqueous dispersion medium are stirred and mixed, thereby forming droplets of the polymerizable monomer mixture in the aqueous dispersion medium. The average droplet diameter of the droplets is preferably caused to substantially consist with the intended average particle diameter of the resulting thermally foamable microspheres and is generally 1 to 200 μm, preferably 3 to 150 μm, particularly preferably 5 to 100 μm. In order to obtain thermally foamable microspheres having an extremely sharp particle size distribution, it is preferable to adopt a process, in which the aqueous dispersion medium and the polymerizable monomer mixture are fed into a continuous high-speed rotation and high-shearing type stirring and dispersing machine, both components are continuously stirred in the stirring and dispersing machine, the resultant dispersion is poured into a polymerization vessel, and suspension polymerization is conducted in the polymerization vessel.

The suspension polymerization is generally conducted at a temperature raised to 30 to 100° C. after the interior of the reaction vessel is deaerated or purged with an inert gas. During the suspension polymerization, the polymerization temperature may be controlled to a fixed temperature or raised stepwise to conduct the polymerization. After the suspension polymerization, the reaction mixture containing thermally foamable microspheres formed is treated by a method such as filtration, centrifugation or precipitation to separate the thermally foamable microspheres from the reaction mixture. The thermally foamable microspheres separated are washed and filtered and then recovered in a state of wet cake. The thermally foamable microspheres are dried at a comparatively low temperature, at which no foaming is initiated, as needed.

If necessary, the thermally foamable microspheres thus obtained may be surface-treated with various kinds of compounds. In addition, inorganic fine powder may be caused to adhere to the surfaces of the thermally foamable microspheres to prevent aggregation between particles. Furthermore, the surfaces of the thermally foamable microspheres may be coated with various materials.

(5) Thermally Foamable Microsphere

The thermally foamable microspheres according to the present invention have a structure that a foaming agent is encapsulated in an outer shell formed from a polymer. The polymer forming the outer shell is formed by polymerization of a polymerizable monomer (mainly, vinyl monomer). When the vinyl monomer and a crosslinkable monomer are used in combination, the temperature dependence of the elastic modulus of the shell polymer can be made small.

Preferably a vinylidene chloride (co)polymer or (meth)acrylonitrile (co)polymer, more preferably a vinylidene chloride copolymer and a (meth)acrylonitrile copolymer, particularly preferably a (meth)acrylonitrile copolymer is used as the polymer, whereby an outer shell improved in gas barrier properties and having excellent heat resistance and solvent resistance can be formed.

No particular limitation is imposed on the average particle diameter of the thermally foamable microspheres according to the present invention. However, the average particle diameter is generally 1 to 200 µm, preferably 3 to 150 µm, particularly preferably 5 to 100 µm. If the average particle diameter of the thermally foamable microspheres is too small, such thermally foamable microspheres come to have insufficient foamability. If the average particle diameter of the thermally foamable microspheres is too great, surface smoothness in fields, of which a beautiful appearance is required, is impaired, and so such too great average particle diameter is not preferred. In addition, even the resistance to shearing force upon processing becomes insufficient.

The content of the foaming agent in the thermally foamable microspheres according to the present invention is generally 5 to 50% by weight, preferably 7 to 40% by weight. If the content of the foaming agent is too low, the expansion ratios of such thermally foamable microspheres become insufficient. If the content is too high, the thickness of the outer shell becomes too thin, so that such thermally foamable microspheres tend to cause premature foaming and breakdown of the outer shell due to shearing force under heating upon processing.

Since the foaming agent containing isododecane is used in the present invention, a processing temperature prior to foaming can be raised. Specifically, when isododecane is used, as a foaming agent, singly or in a proportion of at least 80% by weight, a thermally foamable microsphere, which does not foam even when it is heated to 240° C. in accordance with a TMA (Thermo Mechanical Analysis) measurement, can be obtained. Even when isododecane and a foaming agent having a boiling point lower than that are used in combination, and the proportion of isododecane is at most 50% by weight, a thermally foamable microsphere, whose foaming start temperature is higher than 180° C., preferably at least 185° C. as determined by the TMA measurement, can be obtained. However, the foaming start temperature according to the TMA measurement can be controlled to at least 170° C., preferably at least 175° C., more preferably at least 180° C. in application fields in which the processing temperature may be lowered.

Since the foaming start temperature can be raised in the thermally foamable microspheres according to the present invention, undesired premature foaming can be inhibited even when the microspheres are subjected to thermal hysteresis at a high temperature upon mixing with a synthetic resin, rubber, binder resin or the like. The thermally foamable microspheres according to the present invention may be melt-extruded together with, for example, various kinds of thermoplastic resins to prepare pellets containing unfoamed thermally foamable microspheres. Accordingly, the kinds of usable polymer materials and the like can be dramatically widened in the thermally foamable microspheres according to the present invention.

According to the present invention, thermally foamable microspheres exhibiting various foaming behaviors can be provided by controlling the kind and compositional ratio of the polymerizable monomer(s) used and selecting the kind and compositional ratio of the foaming agent containing isododecane.

The thermally foamable microspheres according to the present invention are excellent in processability at a high temperature prior to foaming, but are high in foaming start temperature on the other hand. In many application fields, a low foaming start temperature is desired. The foaming start temperature of the thermally foamable microspheres according to the present invention can be greatly lowered by heat-treating them in advance. For example, after the thermally foamable microsphere according to the present invention is subjected to a processing step of mixing it with a polymer material such as a synthetic resin or rubber, the resultant mixture is heat-treated in advance prior to foam molding, whereby the foaming start temperature can be lowered. When the thermally foamable microspheres according to the present invention are subjected to thermal hysteresis upon processing, the foaming start temperature after that is lowered. When the lowering of the foaming start temperature is not marked, such thermally foamable microspheres may be mixed with a polymer material or the like after the heat treatment.

The heat treatment of the thermally foamable microspheres is performed under heat treatment conditions of a temperature of not higher than the boiling point (177° C.) of isododecane, preferably 50 to 175° C., more preferably 100 to 175° C. and a period of time of generally 10 seconds to 10 minutes, preferably from 30 seconds to 5 minutes, particularly preferably from 1 to 3 minutes. It is preferable that when the heat treatment temperature is high, the heat treatment time be made short, while the heat treatment time be made long when the heat treatment temperature is low. Such heat treatment permits lowering the foaming start temperature to generally 180° C. or lower, preferably 175° C. or lower, particularly preferably 170° C. or lower. In order to lower the foaming start temperature of the thermally foamable microspheres by such heat treatment, it is preferable to use isododecane and a foaming agent having a boiling point lower than that, preferably a hydrocarbon having a boiling point of 110° C. or lower in combination. The low-boiling foaming agent penetrates into the shell polymer during the heat treatment to plasticize the outer shell so as to contribute to lowering of the foaming start temperature.

As described above, the foaming start temperature of the thermally foamable microspheres according to the present invention can be controlled to higher than 180° C. However, the foaming start temperature can be lowered to 180° C. or lower by the heat treatment at 170° C. for 2 minutes.

Supposing that, for example, an expansion ratio when heated and foamed for 1 minute at 200° C. after the heat treatment is conducted at 170° C. for 2 minutes is R1, and an expansion ratio when heated and foamed for 4 minutes at 200° C. after the heat treatment is conducted at 170° C. for 2 minutes is R2, the thermally foamable microspheres according to the present invention exhibit a value as high as at least 60%, preferably 60 to 85%, more preferably 65 to 83% with respect to a percent reduction in expansion ratio, which is represented by the equation $[(R2/R1) \times 100]$. Such stable high-temperature foaming behavior indicates that the thermally foamable microspheres according to the present invention undergo little shrink due to gas escaping.

The thermally foamable microspheres according to the present invention are little in shrink as demonstrated by the fact that a temperature (hereinafter referred to as "50% shrink temperature"), at which the expansion ratio is lowered to 50% of the maximum expansion ratio when heating by temperature rise is continued after foaming, is generally at least 200° C., preferably at least 210° C., more preferably at least 215° C.

Furthermore, the thermally foamable microspheres according to the present invention are little in shrink even when they are foamed after the heat treatment (for example, 170° C. for 2 minutes) as demonstrated by the fact that a temperature (hereinafter referred to as "50% shrink temperature"), at which the expansion ratio is lowered to 50% of the maximum expansion ratio when heating by temperature rise is continued after foaming, is generally at least 200° C., preferably at least 210° C., more preferably at least 215° C.

The expansion ratio of the thermally foamable microspheres according to the present invention can be controlled by controlling the foaming temperature and forming time. The thermally foamable microspheres according to the present invention can provide foamed particles having a stable expansion ratio, since they undergo little shrink due to gas escaping after foamed once at a desired expansion ratio.

(6) Applications

The thermally foamable microspheres according to the present invention are used in various fields after they are thermally foamed (thermally expanded) or as they are kept unfoamed. The thermally foamable microspheres are used as, for example, fillers for paints for automobiles and the like; foaming agents (thermally foamable foaming agents) for wallpapers and foaming inks (for applying relief patterns to T-shirts and the like); and shrink-preventing agents making good use of their expanding ability.

The thermally foamable microspheres according to the present invention are used for the purpose of reducing the weights of polymer materials such as synthetic resins (thermoplastic resins and thermosetting resins) and rubbers, paints, various materials, etc., making them porous and imparting various functionalities (for example, slip property, heat insulating property, cushioning property, sound insulating property, etc.) making good use of their volume increase by foaming. Examples of the polymer materials include polyethylene, polypropylene, polystyrene, ABS resins, SBS, SIS, hydrogenated SBS, hydrogenated SIS, natural rubber, various kinds of synthetic rubbers, and thermoplastic polyurethane.

The thermally foamable microspheres according to the present invention can be preferably used in the fields of paints, wallpapers and inks, of which surface properties and smoothness are required. Since the thermally foamable microspheres according to the present invention are excellent in processability, they may be suitably applied to application fields of which a processing step such as kneading, calendering, extrusion or injection molding is required.

As described above, the thermally foamable microspheres according to the present invention can be used as foaming agents or mixed with polymer materials into compositions. The thermally foamable microspheres according to the present invention can be melt-kneaded together with thermoplastic resins as they are kept unfoamed, thereby forming pellets. The thermally foamable microspheres according to the present invention can be incorporated into polymer materials, paints, inks and the like and heated and foamed to provide articles (for example, foamed moldings, foamed coating films and foamed inks) containing foamed particles.

The thermally foamable microspheres according to the present invention can also be used for the purpose of developing the function of a colorant such as a dye, perfume base, insecticide, antimicrobial agent, or the like by dissolving or dispersing such a substance in the foaming agent containing isododecane. The thermally foamable microspheres having such a function can also be used as they are kept unfoamed.

EXAMPLES

The present invention will hereinafter be described more specifically by the following Examples and Comparative Examples.

<Measuring Methods>

(1) Foaming Start Temperature, Maximum Foaming Temperature and 50% Shrink Temperature TMA measurement was conducted by means of a TMA-7 type manufactured by Perkin Elmer Co. About 0.25 mg of a sample was used, and its temperature was raised at a heating rate of 5° C./min to observe its foaming behavior. More specifically, the sample (thermally foamable microspheres) was placed in a container, and its temperature was raised at a heating rate of 5° C./min to continuously measure changes in its height. A temperature, at which the change in its height started, was regarded as a foaming start temperature ($T_{start}$), and a temperature, at which the height became maximum, was regarded as a maximum foaming temperature ($T_{max}$). A temperature, at which the height was lowered to 50% of the maximum height beyond the maximum foaming temperature, was regarded as a 50% shrink temperature.

(2) Expansion Ratio

Thermally foamable microspheres (0.7 g) were placed in a Geer oven and heated for 2 minutes at a prescribed temperature (foaming temperature) to foam them. The resultant foams were placed in a graduated cylinder to measure their volume. This volume was divided by the volume of the thermally foamable microspheres before the foaming to calculate out an expansion ratio. The expansion ratio was measured as to those subjected to no heat treatment and those subjected to a heat treatment at 170° C. for 2 minutes.

(3) Average Particle Diameter

The particle size distribution of thermally foamable microspheres was measured by means of a particle diameter distribution meter SALD-3000 J manufactured by Shimadzu Corporation to indicate an average particle diameter (µm) in terms of a median diameter thereof.

Example 1

(1) Preparation of Aqueous Dispersion Medium

Twenty five grams of 20% by weight colloidal silica, 1.0 g of a 50% by weight condensation product (acid value: 78 mg KOH/g) of diethanolamine and adipic acid, 0.06 g of sodium nitrite, 89 g of sodium chloride and 276 g of water were mixed to prepare an aqueous dispersion medium. Hydrochloric acid was added to this aqueous dispersion medium to adjust its pH to 3.2.

(2) Preparation of Polymerizable Mixture

A polymerizable monomer mixture was prepared by mixing a polymerizable mixture composed of 67 g of acrylonitrile, 31 g of methacrylonitrile, 2 g of methyl methacrylate, 1.5 g of diethylene glycol dimethacrylate, 5 g of isopentane, 25 g of isododecane and 1.2 g of 2,2'-azobisisobutyronitrile.

(3) Suspension Polymerization

The above-prepared aqueous dispersion medium and polymerizable mixture were stirred and mixed in a homogenizer to form minute droplets of the polymerizable monomer mixture in the aqueous dispersion medium. The aqueous dispersion medium containing the minute droplets of this polymerizable mixture was charged into a polymerization vessel (1.5 L) equipped with a stirrer and heated for 15 hours at 60° C. and additionally for 10 hours at 70° C. by means of a hot water bath to conduct a reaction. After the polymerization, a slurry containing thermally foamable microspheres formed was filtered, washed with water and dried to obtain thermally foamable microspheres having an average particle diameter of 32 nm.

(4) Evaluation of Foamability

The thermally foamable microspheres obtained above were used as a sample as they are to conduct TMA measurement. As a result, no foaming occurred even when they were heated up to 240° C. The thermally foamable microspheres were heat-treated at 170° C. for 2 minutes and then subjected to the TMA measurement. As a result, it was found that the foaming start temperature is 150° C., the maximum foaming temperature is 188° C., and the 50% shrink temperature is 215° C.

After the thermally foamable microspheres were heated at 170° C. for 2 minutes, an expansion ratio R1 when heated and foamed at 200° C. for 1 minute and an expansion ratio when heated and foamed at 200° C. for 4 minutes were measured to find a proportion [(R2/R1×100)] of the expansion ratio R2 upon the heating for 4 minutes to the expansion ratio R1 upon the heating for 1 minute. As a result, it was 69%.

Example 2

Suspension polymerization was conducted in the same manner as in Example 1 except that the foaming agent was changed from 30 g of the mixture of isopentane and isododecane to 30 g of a mixture of 1 g of isopentane, 13 g of isooctane and 16 g of isododecane, thereby obtaining thermally foamable microspheres having an average particle diameter of 51 µm.

The thermally foamable microspheres obtained above were used as a sample as they are to conduct TMA measurement. As a result, it was found that the foaming start temperature is 194° C., the maximum foaming temperature is 209° C., and the 50% shrink temperature is 223° C.

The thermally foamable microspheres were heat-treated at 170° C. for 2 minutes and then subjected to the TMA measurement. As a result, it was found that the foaming start temperature is 155° C., the maximum foaming temperature is 193° C., and the 50% shrink temperature is 218° C.

After the thermally foamable microspheres were heated at 170° C. for 2 minutes, an expansion ratio R1 when heated and foamed at 200° C. for 1 minute and an expansion ratio when heated and foamed at 200° C. for 4 minutes were measured to find a proportion [(R2/R1×100)] of the expansion ratio R2 upon the heating for 4 minutes to the expansion ratio R1 upon the heating for 1 minute. As a result, it was 80%.

Example 3

Suspension polymerization was conducted in the same manner as in Example 1 except that the foaming agent was changed from 30 g of the mixture of isopentane and isododecane to 30 g of a mixture of 13 g of isooctane and 17 g of isododecane, thereby obtaining thermally foamable microspheres having an average particle diameter of 53 µm.

The thermally foamable microspheres obtained above were used as a sample as they are to conduct TMA measurement. As a result, it was found that the foaming start temperature is 200° C., the maximum foaming temperature is 215° C., and the 50% shrink temperature is 225° C.

The thermally foamable microspheres were heat-treated at 170° C. for 2 minutes and then subjected to the TMA measurement. As a result, it was found that the foaming start temperature is 163° C., the maximum foaming temperature is 193° C., and the 50% shrink temperature is 220° C.

After the thermally foamable microspheres were heated at 170° C. for 2 minutes, an expansion ratio R1 when heated and foamed at 200° C. for 1 minute and an expansion ratio when heated and foamed at 200° C. for 4 minutes were measured to find a proportion [(R2/R1×100)] of the expansion ratio R2 upon the heating for 4 minutes to the expansion ratio R1 upon the heating for 1 minute. As a result, it was 73%.

Comparative Example 1

Suspension polymerization was conducted in the same manner as in Example 1 except that the foaming agent was changed from 30 g of the mixture of isopentane and isododecane to 30 g of a mixture of 20 g of isopentane and 10 g of isooctane, thereby obtaining thermally foamable microspheres having an average particle diameter of 39 µm.

The thermally foamable microspheres obtained above were used as a sample as they are to conduct TMA measurement. As a result, it was found that the foaming start temperature is 130° C., the maximum foaming temperature is 180° C., and the 50% shrink temperature is 206° C. It was apparent that the thermally foamable microspheres are too low in foaming start temperature and thus unsuitable for use in processing at a high temperature. Therefore, the measurements after that were not conducted.

Comparative Example 2

Suspension polymerization was conducted in the same manner as in Example 1 except that the foaming agent was changed from 30 g of the mixture of isopentane and isododecane to 30 g of isooctane, thereby obtaining thermally foamable microspheres having an average particle diameter of 40 µm.

The thermally foamable microspheres obtained above were used as a sample as they are to conduct TMA measurement. As a result, it was found that the foaming start temperature is 176° C., the maximum foaming temperature is 188° C., and the 50% shrink temperature is 214° C.

The thermally foamable microspheres were heat-treated at 170° C. for 2 minutes and then subjected to the TMA measurement. As a result, it was found that the foaming start temperature is 140° C., the maximum foaming temperature is 190° C., and the 50% shrink temperature is 213° C.

After the thermally foamable microspheres were heated at 170° C. for 2 minutes, an expansion ratio R1 when heated and foamed at 200° C. for 1 minute and an expansion ratio when heated and foamed at 200° C. for 4 minutes were measured to find a proportion [(R2/R1×100)] of the expansion ratio R2 upon the heating for 4 minutes to the expansion ratio R1 upon the heating for 1 minute. As a result, it was 59%.

With respect to the respective thermally foamable microspheres obtained in Examples 1 to 3 and Comparative Examples 1 and 2, the measured results of the foaming start temperatures ($T_{start}$), maximum foaming temperatures ($T_{max}$) and 50% shrink temperatures before the heat treatment, and the foaming start temperatures ($T_{start}$), maximum foaming temperatures ($T_{max}$), 50% shrink temperatures and proportions of (R2/R1) after the heat treatment at 170° C. for 2 minutes are shown collectively in Table 1.

TABLE 1

| | | | Comp. Ex. 1 | Comp. Ex. 2 | Ex. 1 | Ex. 2 | Ex. 3 |
|---|---|---|---|---|---|---|---|
| Polymerizable monomer | | | | | | | |
| Acrylonitrile | | | 67 | 67 | 67 | 67 | 67 |
| Methacrylonitrile | | | 31 | 31 | 31 | 31 | 31 |
| Methyl methacrylate | | | 2 | 2 | 2 | 2 | 2 |
| Crosslinkable monomer (DEGDMA*) | | | 1.5 | 1.5 | 1.5 | 1.5 | 1.5 |
| Foaming agent | | | | | | | |
| Isopentane | | | 20 | — | 5 | 1 | — |
| Isooctane | | | 10 | 30 | — | 13 | 13 |
| Isododecane | | | — | — | 25 | 16 | 17 |
| Average particle diameter (μm) | | | 39 | 40 | 32 | 51 | 53 |
| TMA method | Before heat treatment | $T_{start}$ (° C.) | 130 | 176 | Not foamed below 240° C. | 194 | 200 |
| | | $T_{max}$ (° C.) | 180 | 188 | | 209 | 215 |
| | | 50% shrink temperature | 206 | 214 | | 223 | 225 |
| | After heat treatment at 170° C./2 min. | $T_{start}$ (° C.) | — | 140 | 150 | 155 | 163 |
| | | $T_{max}$ (° C.) | — | 190 | 188 | 193 | 193 |
| | | 50% shrink temperature | — | 213 | 215 | 218 | 220 |
| Expansion ratio (after heat treatment at 170° C. for 2 min. | 200° C./1 min. (R1) | | — | 56 | 26 | 50 | 30 |
| | 200° C./2 min. | | — | 48 | 21 | 46 | 28 |
| | 200° C./4 min. (R2) | | — | 33 | 18 | 40 | 22 |
| | (R2/R1) × 100 (%) | | — | 59 | 69 | 80 | 73 |

(Note)
DEGDMA: Diethylene glycol dimethacrylate

INDUSTRIAL APPLICABILITY

According to the present invention, there can be provided a thermally foamable microsphere, which permits raising a processing temperature and undergoes little shrink due to gas escaping after foaming. According to the present invention, there can also be provided a thermally foamable microsphere, which permits raising a processing temperature before foaming and moreover lowering a foaming temperature upon foam molding by conducting a heat treatment. According to the present invention, there can further be provided a thermally foamable microsphere, which can provide foamed particles having a desired expansion ratio by controlling foaming conditions.

The thermally foamable microspheres can be used as, for example, fillers for paints for automobiles and the like; foaming agents for wallpapers and foaming inks (for applying relief patterns to T-shirts and the like); and shrink-preventing agents as they are kept unfoamed or making good use of their expanding ability. The thermally foamable microspheres according to the present invention can be used for the purpose of reducing the weights of polymer materials, paints, various materials, etc., making them porous and imparting various functionalities making good use of their volume increase by foaming. Various functionalities can be imparted to the thermally foamable microspheres according to the present invention by, for example, conducting a surface treatment or adding various kinds of additive components such as dyes to the foaming agent.

The invention claimed is:

1. A thermally foamable microsphere having a structure that a foaming agent is encapsulated in an outer shell formed from a polymer,
    wherein the thermally foamable microsphere has a foaming start temperature which is higher than 180° C., and has a foaming start temperature after a heat treatment at 170° C. for 2 minutes which is at most 180° C.,
    wherein the thermally foamable microsphere exhibits 60 to 85% with respect to a percent reduction in expansion ratio, which is represented by the equation [(R2/R1)×100], where R1 is an expansion ratio when heated and foamed for 1 minute at 200° C. after the heat treatment is conducted at 170° C. for 2 minutes, and R2 is an expansion ratio when heated and foamed for 4 minutes at 200° C. after the heat treatment is conducted at 170° C. for 2 minutes,
    wherein the outer shell formed of at least one of the following:
        (a) a vinylidene (co)polymer consisting of:
            (A) 30 to 100% by weight of vinylidene chloride,
            (B) 0 to 70° A by weight of at least one vinyl monomer selected from the group consisting of acrylonitrile, methacrylonitrile, acrylic esters, methacrylic esters, styrene and vinyl acetate, and (C) a crosslinkable monomer in a proportion of at most 5 parts by weight per 100 parts by weight in total of (A) and (B), or (b) a (meth)acrylonitrile (co)polymer consisting of:
(D) 30 to 100% by weight of at least one nitrile monomer selected from the group consisting of acrylonitrile and methacrylonitrile,
(E) 0 to 70% by weight of at least one other vinyl monomer selected from the group consisting of vinylidene chloride, acrylic esters, methacrylic esters, styrene and vinyl acetate, and
(F) a crosslinkable monomer in a proportion of at most 5 parts by weight per 100 parts by weight in total of (D) and (E), and wherein the foaming agent is a mixture containing (G) 50 to 90% by weight of isododecane and (H) 10 to 50% by weight of foaming agent(s) having a boiling point lower than the boiling point of isododecane, wherein the percentages for (G) and (H) are based on a total weight of the mixture.

2. The thermally foamable microsphere according to claim 1, wherein the foaming agent(s) having a boiling point lower than isododecane are hydrocarbon(s) having a boiling point of at most 110° C.

3. The thermally foamable microsphere according to claim 1, wherein the (meth)acrylonitrile copolymer is a copolymer obtained by polymerizing a polymerizable monomer mixture containing 70 to 99% by weight of at least one nitrile monomer selected from the group consisting of acrylonitrile and methacrylonitrile and 1 to 30% by weight of at least one monomer selected from the group consisting of acrylic esters and methacrylic esters.

4. A method of using the thermally foamable microsphere according to claim 1, comprising using the thermally foamable microsphere as a thermally foamable foaming agent.

5. A composition comprising the thermally foamable microsphere according to claim 1 and at least one polymer material.

6. The composition according to claim 5, which is in the form of pellets comprising the unfoamed thermally foamable microsphere and at least one polymer material.

7. An article containing foamed particles obtained by heating and foaming the thermally foamable microsphere according to claim 1.

8. A method of using the thermally foamable microsphere according to claim 1, comprising:
adding the thermally foamable microsphere as a thermally foamable foaming agent into polymer materials, paints or inks, and heating and foaming to provide articles containing foamed particles.

9. A method for producing a thermally foamable microsphere having a structure that a foaming agent is encapsulated in an outer shell formed from a polymer formed by suspension-polymerizing at least one polymerizable monomer in the presence of the foaming agent in an aqueous dispersion medium containing a dispersion stabilizer,
wherein the thermally foamable microsphere has a foaming start temperature which is higher than 180° C., and has a foaming start temperature after a heat treatment at 170° C. for 2 minutes which is at most 180° C.,
wherein the thermally foamable microsphere exhibits 60 to 85% with respect to a percent reduction in expansion ratio, which is represented by the equation $[(R2/R1) \times 100]$, where R1 is an expansion ratio when heated and foamed for 1 minute at 200° C. after the heat treatment is conducted at 170° C. for 2 minutes, and R2 is an expansion ratio when heated and foamed for 4 minutes at 200° C. after the heat treatment is conducted at 170° C. for 2 minutes,
wherein the polymerizable monomer(s) consist of at least one of the following combinations:
(A) 30 to 100% by weight of vinylidene chloride,
(B) 0 to 70% by weight of at least one vinyl monomer selected from the group consisting of acrylonitrile, methacrylonitrile, acrylic esters, methacrylic esters, styrene and vinyl acetate, and
(C) a crosslinkable monomer in a proportion of at most 5 parts by weight per 100 parts by weight in total of (A) and (B), or
(D) 30 to 100% by weight of at least one nitrile monomer selected from the group consisting of acrylonitrile and methacrylonitrile,
(E) 0 to 70% by weight of at least one other vinyl monomer selected from the group consisting of vinylidene chloride, acrylic esters, methacrylic esters, styrene and vinyl acetate, and
(F) a crosslinkable monomer in a proportion of at most 5 parts by weight per 100 parts by weight in total of (D) and (E), and wherein the foaming agent is a mixture containing (G) 50 to 90% by weight of isododecane and (H) 10 to 50% by weight of foaming agent(s) having a boiling point lower than the boiling point of isododecane, wherein the percentages for (G) and (H) are based on a total weight of the mixture.

10. The production method according to claim 9, wherein the other foaming agent(s) having a boiling point lower than isododecane are hydrocarbon(s) having a boiling point of at most 110° C.

* * * * *